United States Patent
Tsao

(10) Patent No.: US 6,877,881 B2
(45) Date of Patent: Apr. 12, 2005

(54) WORKLIGHT

(76) Inventor: Frank Tsao, 5 Marram Court, Cleveland, Old 4163 (AU)

(*) Notice: Subject to any disclaimer, the term of this patent is extended or adjusted under 35 U.S.C. 154(b) by 26 days.

(21) Appl. No.: 10/437,795

(22) Filed: May 14, 2003

(65) Prior Publication Data

US 2004/0228133 A1 Nov. 18, 2004

(51) Int. Cl.$^7$ .............................................. F21V 17/08
(52) U.S. Cl. ..................... 362/287; 362/226; 362/220; 362/285; 362/282; 362/270; 362/372; 362/414; 362/422; 362/428
(58) Field of Search ............................... 362/287, 226, 362/220, 285, 282, 270, 269, 372, 413, 414, 410, 419, 422, 427, 428, 457; 248/125.8, 151, 125.7, 177.1

(56) References Cited

U.S. PATENT DOCUMENTS 5,887,966 A * 3/1999 Eissner et al. ........... 362/153.1
6,354,720 B2 * 3/2002 Grossman et al. .......... 362/427

* cited by examiner

Primary Examiner—Sandra O'Shea
Assistant Examiner—Sharon Payne
(74) Attorney, Agent, or Firm—Raymond Y. Chan; David and Raymond

(57) ABSTRACT

A worklight includes a worklight housing for receiving a light source therein and a worklight stand including a U-shaped supporting leg having a lower supporting base and two upper hinge ends pivotally connected to the worklight housing, and a U-shaped pivot leg having a lower standing base and two upper pivot ends, wherein the two hinge ends of the supporting leg are pivotally connected with the two pivot ends of the pivot leg respectively. The worklight stand further includes a foldable stand and a supporting frame, which is supported on foldable stand, detachably mounted to the supporting base of the supporting leg and the standing base of the pivot leg in space apart manner such that the worklight housing is substantially supported on the supporting frame and is elevated via the foldable stand in a stable manner.

18 Claims, 5 Drawing Sheets

WORKLIGHT

BACKGROUND OF THE PRESENT INVENTION

1. Field of Invention

The present invention relates to a supporting frame for a portable light, and more particularly to a worklight stand, which can be quickly and easily unfolded for substantially supporting a worklight thereon and for selectively adjusting a projecting angle of the worklight.

2. Description of Related Arts

Portable worklights are considered as one of the common tools for illumination. Generally, there are two types of worklight, which are floor-type worklight and stand-type worklight, sold commercially. The floor-type worklight is usually placed on a floor through the base of the worklight which typically elevate light housing of the worklight a few inches off of the floor. The stand-type worklight incorporates with a stand to elevate the light housing of the worklight several feet off of the floor.

The stand-type worklight, such as U.S. Pat. No. 6,213,626, would be beneficial and more economical in comparison with the floor-type worklight because the stand-type worklight can function as both the floor-type worklight by detaching the stand from the light housing to function and the stand-type worklight by attaching the stand to the light housing.

However, the stand-type worklight has several drawbacks. As shown in FIG. 1, the stand comprises a supporting pole 1A having an upper end portion detachably attached to the worklight, a collar 2A slidably connected to the supporting pole 1A, and a plurality of legs 3A pivotally connected to the collar 2A to radially extend from the supporting pole 1A, in such a manner that when the collar 2A is downwardly slid along the supporting pole 1A, the legs 3A are radially and outwardly extended so as to support the worklight on the floor. The stand further comprises a plurality of rods 4A each having two ends pivotally connected to a bottom end of the supporting pole 1A and the corresponding leg 3A respectively so as to retain the legs 3A in such unfolded position.

Moreover, the stand further comprises two U-shaped pivot legs 5A each having two ends pivotally connected to the worklight wherein the two pivot legs 5A are adapted to pivotally fold apart to support the worklight on the floor. In addition, the two pivot legs 5A are pivotally folded to overlap with each other wherein the worklight is supported on the supporting pole 1A via the overlapped pivot legs 5A as one-point support configuration such that the weight of the worklight causes the supporting pole 1A to be bent sidewardly such that stresses will be created round the ends of the pivot legs 5A. The stress will then cause a tear at the pivot legs 5A so that the pivot legs 5A will be permanently misshaped at the stress point over a period of continuous use.

Furthermore, since each of the pivot legs 5A has a predetermined fixed height such that the worklight must be rotated about the pivot ends of the pivot legs 5A to adjust the projecting angle. However, the rotational movement of the worklight is restricted by the pivot legs 5A so that the adjustment of the projecting angle of the worklight will be limited. If the worklight is relatively light, such as 10 lbs, the user is able to rotatably elevate the worklight with respect to the pivot legs 5A so as to selectively adjust the projecting angle of the worklight. However, if the worklight is relatively heavy, such as 50 lbs or more, the rotational movement of the worklight for adjusting the projecting angle thereof will cause the unstably support of the worklight on the stand. In other words, it is a hassle for the user to adjust the projecting angle of the worklight once the worklight is supported on the stand.

According to the structural design of the stand, when the worklight is supported on the stand, a downward force of the weight of the worklight is distributed to the legs 3A evenly. However, the weight of the worklight will force the legs 3A to extend outwardly and radially with respect to the supporting pole 1A, so as to drive the collar 2A to slide downwardly along the supporting pole 1A. In order to retain the legs 3A at the unfolded position, each of the rods 4A must be strong enough to overcome the outward radial force of each of the legs 3A for supporting the worklight. It is unreasonable to strengthen the rod 4A to support the weight of the worklight.

In addition, since the structure of each leg 3A must be stronger than that of the respective rod 4A, the weight of the legs 3A will drive the collar 2A to slide downwardly supporting pole 1A once the stand is lifted up. Therefore, the stand must employ a safety locker to lock up the legs 3A at its folded position.

It is worth to mention that when the structural design of the rod 4A is altered, the radial extending movement of each of the legs 3A must be correspondingly changed, which may significantly affect the folding operation of the stand. In other words, the rods 3A play a vital role in the stand to not only support the worklight but also stabilize the worklight with the stand.

SUMMARY OF THE PRESENT INVENTION

A main object of the present invention is to provide a worklight stand, wherein the worklight is supported on the worklight stand by a three-point support configuration to ensure the stabilization of the worklight in comparison with the one-point support configuration of the conventional worklight stand.

Another object of the present invention is to provide a worklight stand, wherein the pivot leg of the worklight stand is adapted to be selectively adjusted its height so as to substantially increase the adjustment of the light projecting angle of the worklight.

Another object of the present invention is to provide a worklight stand, wherein the worklight stand allows the user to adjust the light projecting angle of the worklight when the worklight is stably supported on the worklight stand by adjusting the pivot leg thereof. In other words, the angle adjustment operation of the worklight does not affect the stabilization of the worklight on the worklight stand.

Another object of the present invention is to provide a worklight stand, wherein the angle adjustment operation of the worklight is simple by sliding the support arms along the standing base of the pivot leg so as to adjust the height of the pivot leg.

Another object of the present invention is to provide a worklight stand, wherein the worklight does not require to alter its original structure in order to employ with the pivot legs of the worklight stand, so as to minimize the manufacturing cost of the worklight incorporating with the worklight stand of the present invention. In other words, the worklight stand can be incorporated with all kinds of the conventional worklight.

Another object of the present invention is to provide a worklight stand, wherein the ground legs are pivotally connected to the central shaft to radially extend therefrom so that when the ground legs are radially folded to the unfolded position, the worklight stand can well support the worklight in a stable manner so as to prevent the tipping of the worklight.

Another object of the present invention is to provide a worklight stand, which can be quickly and easily folded for carriage and storage and unfolded for substantially supporting the worklight thereon.

Another object of the present invention is to provide a worklight stand, wherein the weight of the worklight applied on the central shaft will further ensure all the ground legs at the unfolded position.

Another object of the present invention is to provide a worklight stand, wherein the ground legs can reinforce the central shaft and enhance the loading ability of the worklight stand by evenly distributing the weight of the worklight to the ground through the ground legs.

Another object of the present invention is to provide a worklight stand, wherein the structural design of the present invention can automatically lock up the worklight stand at its folded position by the strengthen of the ground legs and at its unfolded position by the weight of the worklight. In other words, the worklight stand can be stably remained at its folded and unfolded positions without employing any locking device.

Another object of the present invention is to provide a worklight stand, which successfully provides an economic and efficient solution for detachably supporting the worklight to elevate the floor-type worklight few feet off of the ground in a stable manner.

Accordingly, in order to accomplish the above objects, the present invention provides a worklight, comprising:

a worklight housing for receiving a light source therein; and a worklight stand, comprising:

a U-shaped supporting leg having a lower supporting base and two upper hinge ends;

a U-shaped pivot leg having a lower standing base and two upper pivot ends, wherein the two hinge ends of the supporting leg are pivotally connected with the two pivot ends of the pivot leg respectively;

a locker joint pivotally connecting the two hinge ends of the first pivot leg at two sidewalls of the worklight housing so as to lock up the worklight housing in position to obtain a light projecting angle thereof;

a foldable stand comprising a central shaft having an elongated shaft body and an upper end portion, and a plurality of ground legs pivotally connected to the central shaft; and a supporting frame, which is supported on the upper end portion of the central shaft, detachably mounted to the supporting base of the supporting leg and the standing base of the pivot leg in space apart manner such that the worklight housing is substantially supported on the supporting frame and is elevated via the foldable stand in a stable manner.

These and other objectives, features, and advantages of the present invention will become apparent from the following detailed description, the accompanying drawings, and the appended claims.

DETAILED DESCRIPTION OF THE PREFERRED EMBODIMENT

Figure 1:
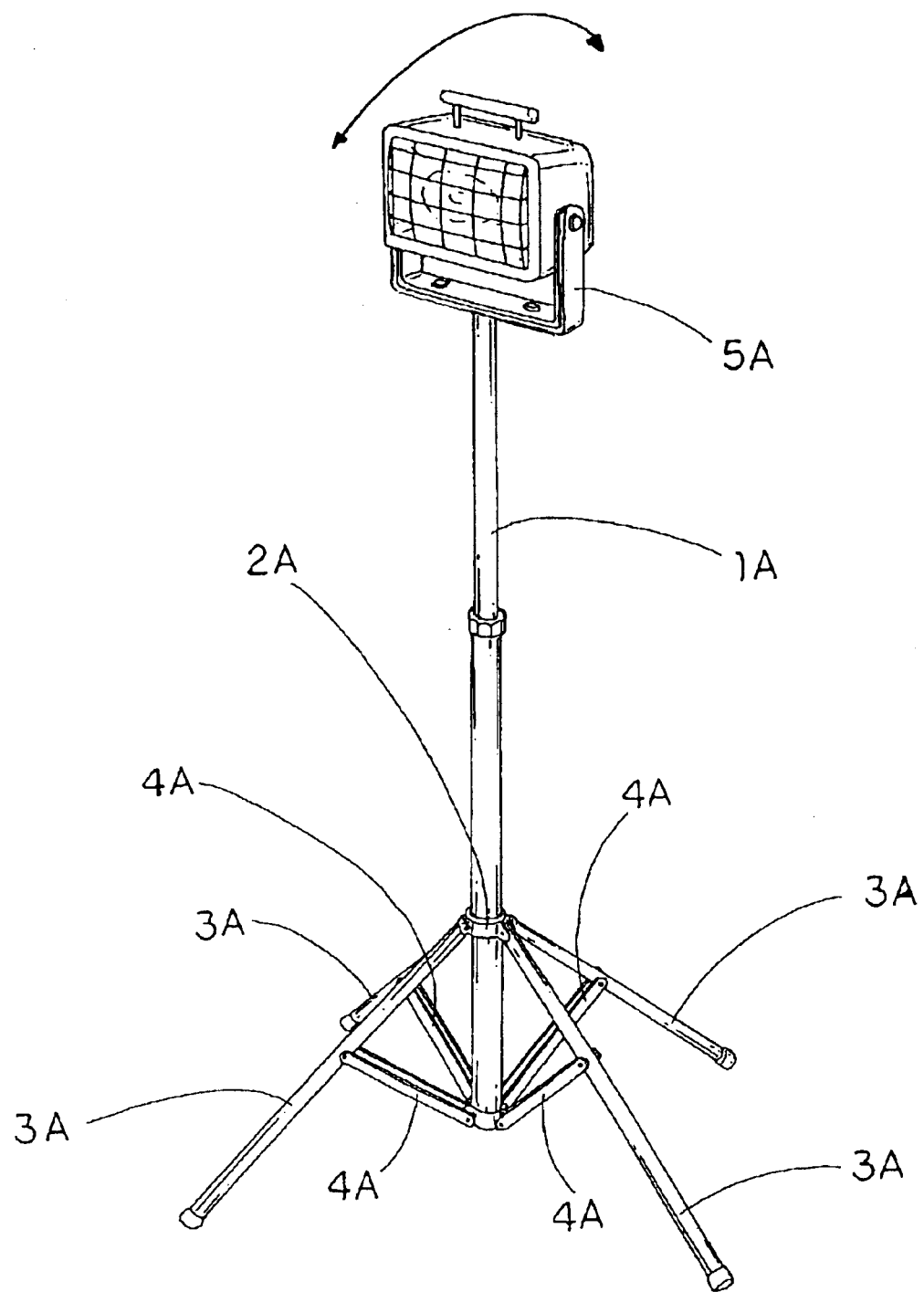
FIG. 1 is a perspective view of a conventional worklight stand.
Figure 2:
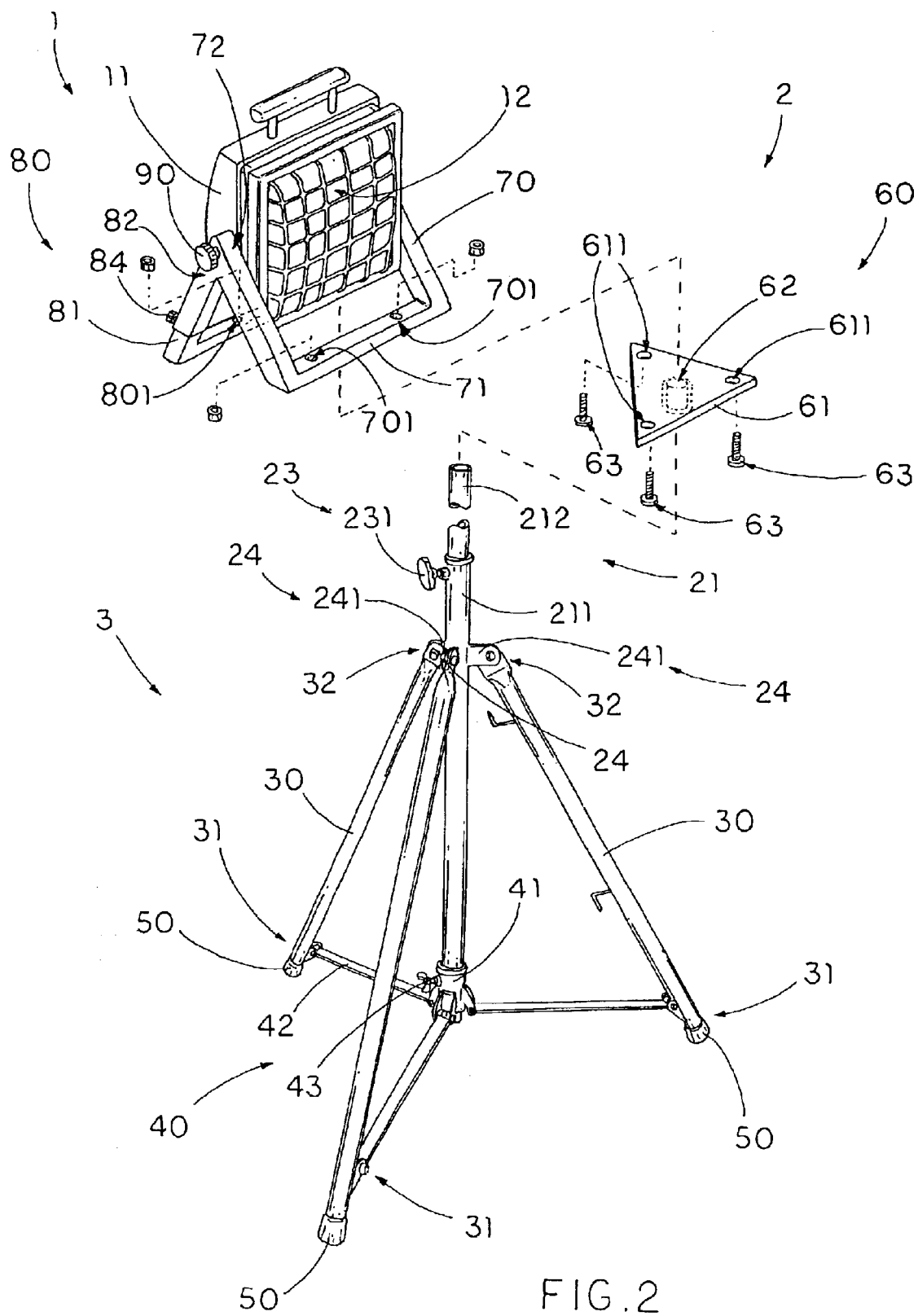
FIG. 2 is a perspective view of a worklight stand at an unfolded position according to a preferred embodiment of the present invention.

Referring to FIG. 2 of the drawings, a worklight stand according to a preferred embodiment of the present invention is illustrated, wherein the worklight stand is capable of supporting a worklight 1 on a support surface. The worklight comprises a worklight housing 11 for receiving a light source 12 therein and a worklight stand 2.

The worklight stand 2 comprises a U-shaped supporting leg 70 having a lower supporting base 71 and two upper hinge ends 72, a U-shaped pivot leg 80 having a lower standing base 81 and two upper pivot ends 82, wherein the two hinge ends 72 of the supporting leg 70 are pivotally connected with the two pivot ends 82 of the pivot leg 80 respectively, and a locker joint 90 pivotally connecting the two hinge ends 72 of the first pivot leg 70 at two sidewalls of the worklight housing 11 so as to lock up the worklight housing 11 in position to obtain a light projecting angle thereof.

The worklight stand further comprises a foldable stand 3 and a supporting frame 60, which is supported on the foldable stand 3, detachably mounted to the supporting base 71 of the supporting leg 70 and the standing base 81 of the pivot leg 80 in space apart manner such that the worklight housing 11 is substantially supported on the supporting frame 60 and is elevated via the foldable stand 3 in a stable manner.

As shown in FIG. 2, the supporting frame 60 comprises a supporting platform 61 having front and rear portions to detachably mount the supporting base 71 of the supporting leg 70 and the standing base 81 of the pivot leg 80 respectively, and a center mounting socket 62 downwardly extended from the supporting platform 61 to detachably attach to the foldable stand 3.

In order to support the worklight housing 11 on the supporting platform 61, the supporting frame 60 further comprises at least two fasteners 63 detachably fastening the supporting base 71 of the supporting leg 70 and the standing base 81 of the pivot leg 80 on the supporting platform 61. Accordingly, there are at least two through holes 701, 801 formed on the supporting base 71 of the supporting leg 70 and the standing base 81 of the pivot leg 80 respectively to align with at least two spaced apart mounting holes 611 formed on the supporting platform 61 wherein in such a manner that by inserting the fasteners 63 into two through holes 701, 801 through the mounting holes 611 respectively, the supporting leg 70 and the pivot leg 80 are securely mounted on the supporting platform 61. It is worth to mention that the standing base 81 of the pivot leg 80 has a flat bottom surface while the pivot leg 80 is folded to mount on the supporting platform 61 so as to easily align the through hole 801 with the respective mounting hole 611 on the supporting platform 61.

As shown in FIG. 2, the supporting platform 61 is shaped to have a triangular shape, wherein there are three mounting through holes 611 formed at three corner portions of the supporting panel of the supporting frame 61 respectively for aligning with three through holes 701, 801 provided on the supporting leg 70 and the pivot leg 80 respectively.

Therefore, the worklight housing 11 is supported on the supporting platform 61 by a three-point support configuration to ensure the stabilization of the worklight in comparison with the one-point support configuration of the conventional worklight stand. In other words, the three-point support configuration of the worklight stand can minimize the stress created around the hinge ends 72 of the supporting leg 70 and the pivot ends 82 of the pivot leg 80 so as to prevent the distortion of the supporting leg 70 and the pivot leg 80 due to the weight of the worklight.

Accordingly, the fasteners 63 are preferred to be hand screws for detachably fastening the worklight on the supporting platform 61 without using any tools. It is obvious that the fasteners 63 can be conventional fasteners such as bolts and nuts to secure the attachment between the worklight and the supporting platform 61.

Figure 3A:
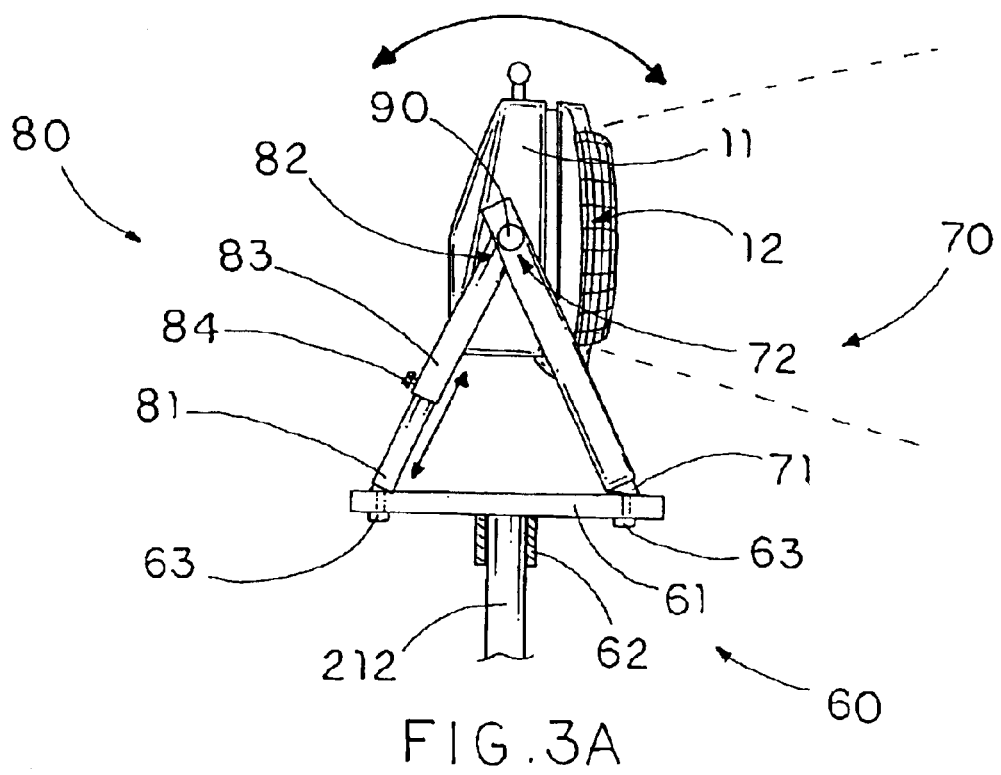
FIG. 3A is a side view of the worklight stand according to the above preferred embodiment of the present invention.
Figure 3B:
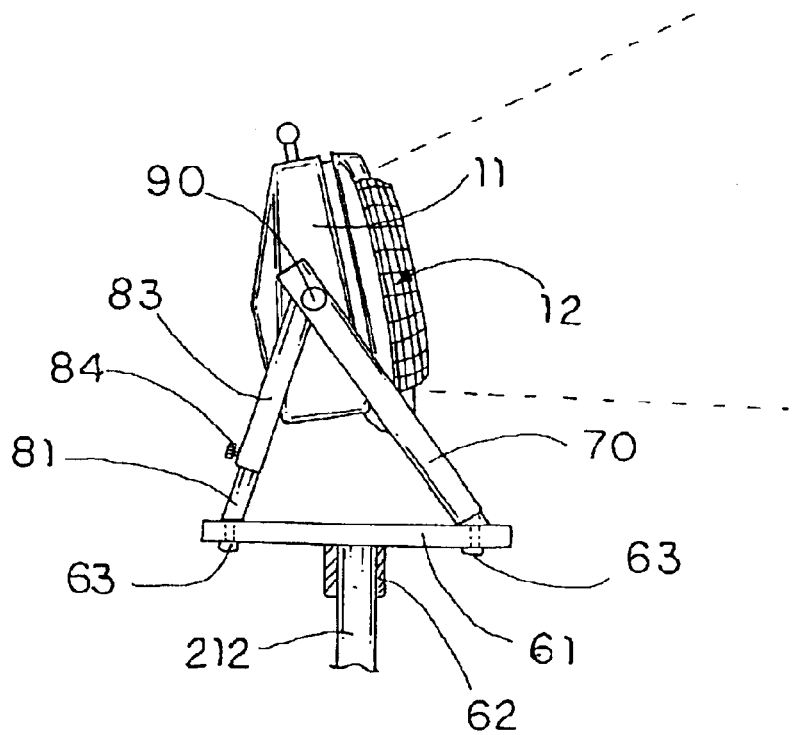
FIG. 3B illustrates the light projecting angle of the worklight being adjusted through the worklight stand according to the above preferred embodiment of the present invention.

As shown in FIG. 3A, the pivot leg 80 further comprises two support arms 83 slidably extended from the standing base 81 and a locking device 84 locking the support arms 83 on the standing base 81 in position wherein the two pivot ends 82 are formed at two upper ends of the support arms 83 respectively in such a manner that a distance between the pivot end 82 of each of the support arms 83 and the standing base 81 is adapted to be selectively adjusted by sliding the respective support arm 83 with respect to the standing base 81, so as to selectively adjust the light projecting angle of the worklight housing 11, as sown in FIG. 3B.

The foldable stand 3 comprises a central shaft 20 having an elongated shaft body 21 and an upper end portion 201 for slidably inserting into the center mounting socket 62 of the supporting frame 60, a plurality of ground legs 30 each having a lower ground end 31 and an upper pivot end 32, and a plurality of pivot joints 24 pivotally connecting the pivot ends 32 of the ground legs to the shaft body 21.

The foldable stand 3 further comprises a retaining unit 40 connected the ground legs 30 to the shaft body 21 at a position below the pivot joints 24 to retain each of the ground legs 30 at an unfolded position. In which, at a folded position, the ground legs 30 are pivotally folded towards the central shaft 20 so as to reduce a distance between the central shaft 20 and the ground end 31 of each of the ground legs 30, and at the unfolded position, the ground legs 30 are pivotally and outwardly folded with respect to the central shaft 20 to radially increase the distance between the central shaft 20 and the ground end 31 of each of the ground legs 30 for stably supporting on the support surface.

According to the preferred embodiment, the central shaft 20 is made of rigid material such as metal to provide a stiff support of the worklight. The shaft body 21 of the central shaft 20 is constructed by first and second tubular members 211, 212 coaxially mounted with each other in a slidably movable manner in such a manner that the shaft body 21 is capable of adjustably increasing a length thereof by coaxially sliding the first tubular member 211 apart from the second tubular member 212, wherein the central shaft 20 further comprises means 23 for securely locking the first tubular member 211 with the second tubular member 212 so as to lock up the shaft body 21 with a predetermined length. In other words, the shaft body 21 can be selectively adjusted its length to elevate the worklight with a predetermined distance from the support surface.

Accordingly, the locking means 23 comprises a length adjustable locker 231 having a locking head transversely and rotatably penetrated through the first tubular member 211 to bias against an outer wall of the second tubular member 212 so as to lock up the first tubular member 211 with the second tubular member 212. Alternatively, the locking means 23 can be a locking pin penetrated through the first and second tubular members 211, 212 to retain the predetermined length of the shaft body 21.

As shown in FIG. 2, each of the pivot joints 24 comprises a connecting wing 241 outwardly and radially extended from the shaft body 21 wherein the pivot end 32 of each of the ground legs 30, which is preferred to be flattened its shaped, is pivotally connected to the connecting wing 241 of the respective pivot joint 24 via a conventional fastener such as bolt and nut, in such a manner that each of the ground legs 30 is capable of pivotally and outwardly folding with respect to the shaft body 21 to increase the distance between the ground end 31 of each of the ground legs 30 and the shaft body 21.

According to the preferred embodiment, the foldable stand 3 comprises three ground legs 30 radially extended from the shaft body 21 of the central shaft 20 in a pivotally movable manner. It is worth to mention that the supporting area of the worklight stand, which is determined by the distance between the ground ends 31 of the ground legs 30 at the unfolded position, should be enlarged in order to enhance the stabilization of the worklight stand. Therefore, when the ground legs 30 are radially extended from the central shaft 20, the center of mass of the worklight falls within the supporting area of the worklight stand so as to prevent the tipping of the worklight when the worklight is supported on the worklight stand of the present invention.

In addition, no sliding movement of each of the ground legs 30 is operated between the unfolded position and the folded position, the weight of the worklight is evenly distributed through the ground legs 30 to the support area so that the worklight stand of the present invention can substantially support the worklight on the support surface in a stable manner.

The foldable stand 3 further comprises a plurality of ground stoppers 50 mounted to the ground ends 31 of the ground legs 30 respectively for protecting the ground ends 31 of the ground legs 30 and for enhancing a friction of the ground end 31 of each of the ground legs 30 with respect to the support surface so as to prevent the worklight stand from slipping on the support surface.

Figure 4:
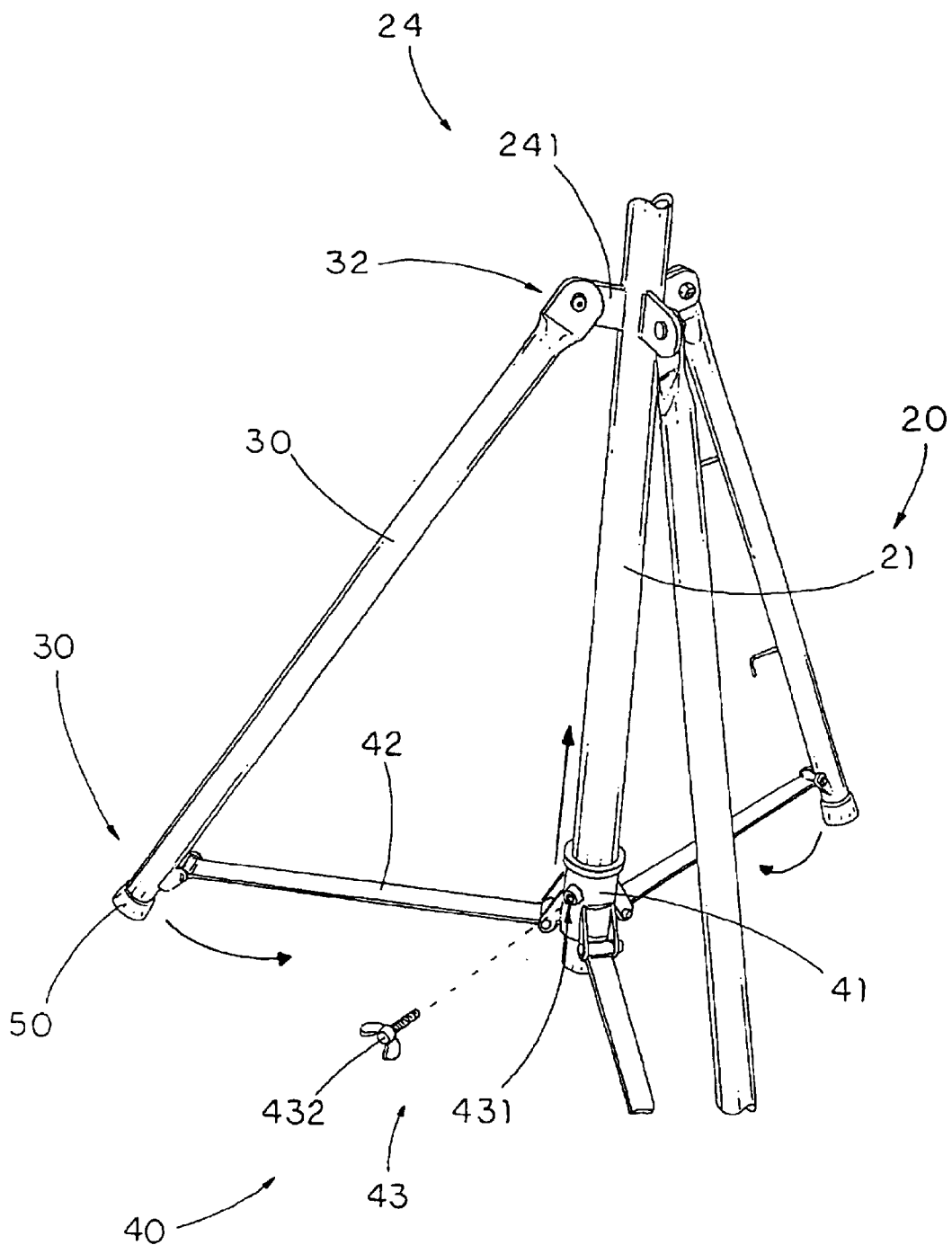
FIG. 4 is a partial perspective view of the foldable stand according to the above preferred embodiment of the present invention.

The retaining unit 40, according to the preferred embodiment, comprises a central hub 41 coaxially mounted on the shaft body 21 of the central shaft 20 in a slidably movable manner and a plurality of corresponding reinforcing arms 42 pivotally connected the central hub 41 to the ground legs 30 respectively in such a manner that when the ground legs 30 are radially and outwardly folded with respect to the shaft body 21, the central hub 41 is driven to slide downwardly along the shaft body 21 through the reinforcing arms 42, so as to retain the distance between the ground end 31 of each of the ground legs 30 and the shaft body 21 through the respective reinforcing arm 42, as shown in FIG. 4.

The central hub 41, having a tubular shaped, has an inner diameter slightly larger than a diameter of the shaft body 21, wherein the central hub 41 is slidably mounted on the shaft body 21 and arranged to slide between the folded position and the unfolded position along the shaft body 21.

Each of the reinforcing arms 42, having a predetermined length, has two ends pivotally connected to the central hub 41 and the respective ground leg 30 at a position above the ground end 31 thereof in such a manner that when the ground legs 30 are radially and outwardly folded to the unfolded position, the reinforcing arms 42 are driven to move radially and outwardly with respect to the shaft body 21 of the central shaft 20 so as to drive the central hub 42 to downwardly slid along the shaft body 21. As shown in FIG. 2, when the ground legs 30 are folded into the unfolded position, the shaft body 21, the respective ground leg 30 and the respective reinforcing arm 42 forms a triangular structure to rigidly support the weight of the worklight in a stable manner.

Accordingly, the outward folding distance of each of the ground legs 30, which is the distance between the ground end 31 of each of the ground legs 30 and the shaft body 21, is controlled by the length of the corresponding reinforcing arm 42 such that when the central hub 41 is slid towards a bottom end of the shaft body 21 at the unfolded position, the reinforcing arms 42 stop the outward folding movements of the ground legs 30 respectively so as to retain the ground legs 30 at the unfolded position.

It is worth to mention that the weight of the worklight mainly distributes to the ground legs 30 such that no significant modification is required to strengthen the reinforcing arms 42. However, the weight of the worklight can substantially distributed from the central shaft 20 to the ground legs 30 through the reinforcing arms 42 respectively so that the reinforcing arms 42 can further reinforce the structure of the worklight stand to enhance the loading ability thereof.

The retaining unit 40 further comprises means 43 for securely locking the central hub 41 on the shaft body 21 at the unfolded position. The locker means 43 has a locker through hole 431 transversely formed on the central hub 41 and comprises a hub locker 432 having a locker head rotatably mounted on the central hub 41 through the locker through hole 431 to bias against the shaft body 21 so as to securely lock up the central hub 41 on the shaft body 21 in position. The hub locker 432 is preferably constructed as a hand screw so that the user is able to lock and unlock the central hub 41 with respect to the shaft body 21 without using any tools.

Alternatively, the hub locker 432 can be embodied as a pin locker arranged to detachably insert into a locker aperture formed on the shaft body 21 through the locker through hole 431 when the central hub 41 is slid on the shaft body 21 to a position that the locker aperture is concentric with the locker through hole 431.

In addition, the locker means 43 can be constructed as a hub stopper provided at a bottom end portion of the shaft body 21 to block the further downward sliding movement of the central hub 41 along the shaft body 21 at the unfolded position.

It is worth to mention that the weight of the worklight applied on the central shaft 20 will drive the ground legs 30 to fold radially and outwardly, so as to ensure the worklight stand at the unfolded position. Furthermore, no significant downward force of the weight of the worklight is applied on the worklight stand to drive the central hub 41 to slide downwardly along the shaft body 21 so as to prevent the worklight stand from being collapsed when the worklight is supported on the worklight stand.

Figure 5:
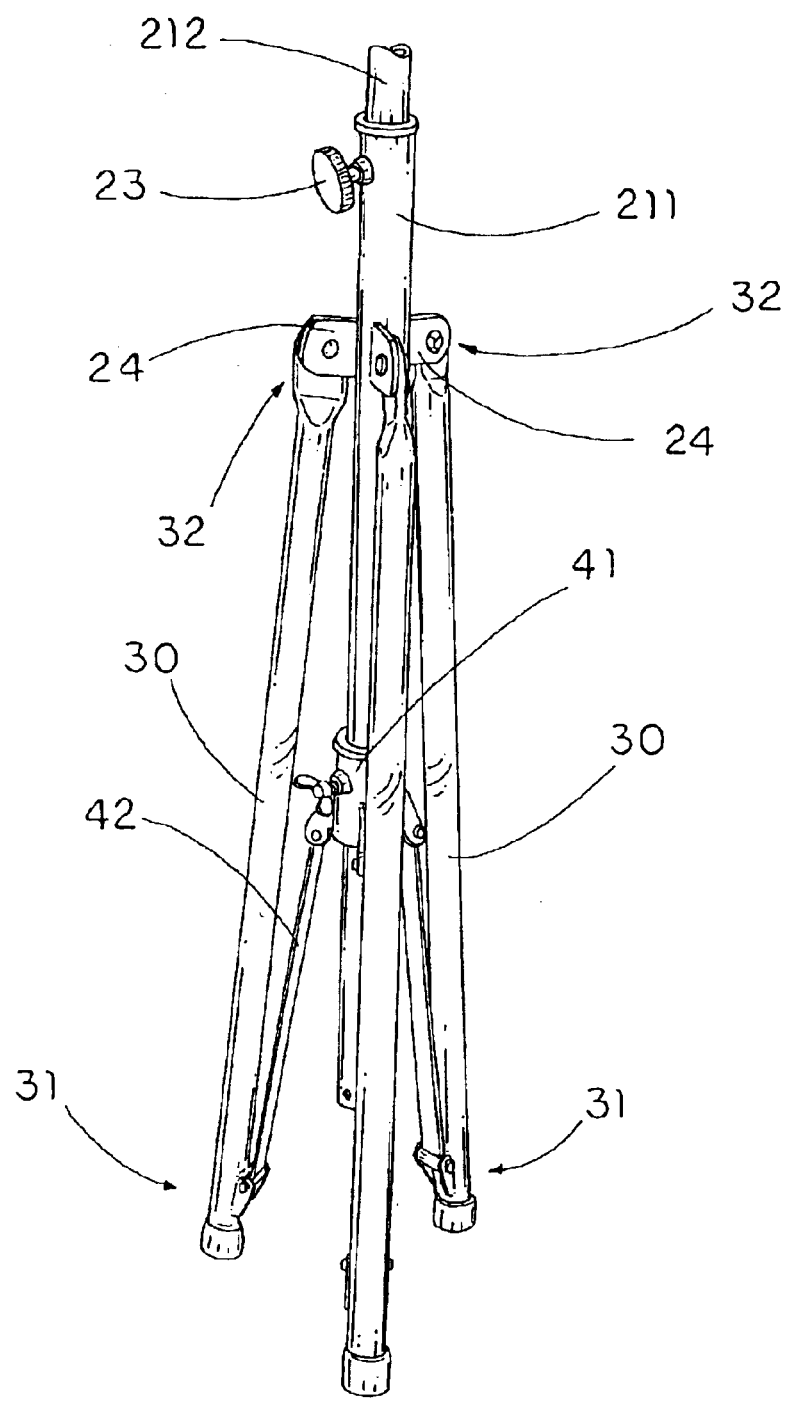
FIG. 5 is a perspective view of the foldable stand at a folded position according to the above preferred embodiment of the present invention.

In addition, in order to fold up the worklight stand of the present invention, the user can simply lift up the central hub 41 along the shaft body 21 of the central shaft 20 such that the pivotal movements of the reinforcing arms 42 drive the ground legs 30 to inwardly and pivotally fold towards the central shaft 20 to form a compact unit, as shown in FIG. 5. It is worth to mention that since the structure of each ground leg 30 is stronger than that of the respective reinforcing arm 42, the ground legs 30 will lock the movements of the reinforcing arms 42 respectively at the folded position, so as to prevent the central hub 41 from sliding downwardly along the shaft body 21 accidentally. Therefore, the user is able to easily fold and unfold the worklight stand in one-single sliding motion by sliding the central hub 41 along the shaft body 21.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A worklight, comprising:
   a worklight housing for receiving a light source therein; and
   a worklight stand, comprising;
   a U-shaped supporting leg having a lower supporting base and two upper hinge ends;
   a U-shaped pivot leg having a lower standing base and two upper pivot ends, wherein said two hinge ends of said supporting leg are pivotally connected with said two pivot ends of said pivot leg respectively, wherein said pivot leg further comprises two support arms slidably extended from said standing base and a locking device locking said support arm on said standing base in position, wherein said two pivot ends are formed at two upper ends of said support arm respectively in such a manner that a distance between said pivot end of each of said support arms and said standing base is adapted to be selectively adjusted by sliding said respective support arm with respect to said standing base, so as to selectively adjust said light projecting angle of said worklight housing; and
   a locker joint pivotally connecting said two hinge ends of said first pivot leg at two sidewalls of said worklight housing so as to lock up said worklight housing in position to obtain a light projecting angle thereof.

2. The worklight, as recited in claim 1, further comprising a foldable stand comprising a central shaft having an elongated shaft body and an upper end portion, and a plurality of ground legs pivotally connected to said central shaft via a plurality of pivot joints respectively, and a supporting frame, which is supported on said upper end portion of said central shaft, detachably mounted to said supporting base of said supporting leg and said standing base of said pivot leg in spaced apart manner such that said worklight housing is substantially supported on said supporting frame and is elevated via said foldable stand in a stable manner.

3. The worklight, as recited in claim 1, wherein said supporting frame comprises a supporting platform having front and rear portions to detachably mount said supporting base of said supporting leg and said standing base of said pivot leg respectively, and a center mounting socket downwardly extended from said supporting platform for said upper end portion of said central shaft of said foldable stand inserting thereinto.

4. The worklight, as recited in claim 2, wherein said supporting frame comprises a supporting platform having front and rear portions to detachably mount said supporting base of said supporting leg and said standing base of said pivot leg respectively, and a center mounting socket downwardly extended from said supporting platform for said upper end portion of said central shaft of said foldable stand inserting thereinto.

5. The worklight, as recited in claim 3, wherein said foldable frame further comprises a retaining unit connecting said ground legs to said shaft body at a position below said pivot joints to retain each of said ground legs at an unfolded position, wherein at a folded position, said ground legs are pivotally and radially folded towards said central shaft so as to reduce a distance between said central shaft and a ground end of each of said ground legs, and at said unfolded position, said ground legs are pivotally and outwardly folded with respect to said central shaft to radially increase said distance between said central shaft and said ground end of each of said ground legs for stably supporting on said support surface.

6. The worklight, as recited in claim 4, wherein said foldable frame further comprises a retaining unit connecting said ground legs to said shaft body at a position below said pivot joints to retain each of said ground legs at an unfolded position, wherein at a folded position, said ground legs are pivotally and radially folded towards said central shaft so as to reduce a distance between said central shaft and a ground end of each of said ground legs, and at said unfolded position, said ground legs are pivotally and outwardly folded with respect to said central shaft to radially increase said distance between said central shaft and said ground end of each of said ground legs for stably supporting on said support surface.

7. The worklight, as recited in claim 4, wherein said retaining unit comprises a central hub coaxially and movably mounted on said shaft body of said central shaft and a plurality of corresponding reinforcing arms respectively connecting said ground legs to said central hub in such a manner that when said ground legs are radially and outwardly folded with respect to said shaft body, each of said reinforcing arms retains said distance between said ground end of each of said respective ground leg and said shaft body.

8. The worklight, as recited in claim 5, wherein said retaining unit comprises a central hub coaxially and movably mounted on said shaft body of said central shaft and a plurality of corresponding reinforcing arms respectively connecting said ground legs to said central hub in such a manner that when said ground legs are radially and outwardly folded with respect to said shaft body, each of said reinforcing arms retains said distance between said ground end of each of said respective ground leg and said shaft body.

9. The worklight, as recited in claim 6, wherein said retaining unit comprises a central hub coaxially and movably mounted on said shaft body of said central shaft and a plurality of corresponding reinforcing arms respectively connecting said ground legs to said central hub in such a manner that when said ground legs are radially and outwardly folded with respect to said shaft body, each of said reinforcing arms retains said distance between said ground end of each of said respective ground leg and said shaft body.

10. The worklight, as recited in claim 7, wherein each of said reinforcing arm, having a predetermined length, has two ends pivotally connecting to said central hub and said respective ground leg at a position above said ground end thereof in such a manner that when said ground legs are outwardly folded into said unfolded position, said distance between said ground end of each of said ground leg and said shaft body is retained by said length of said respective reinforcing arm.

11. The worklight, as recited in claim 8, wherein each of said reinforcing arm, having a predetermined length, has two ends pivotally connecting to said central hub and said respective ground leg at a position above said ground end thereof in such a manner that when said ground legs are outwardly folded into said unfolded position, said distance between said ground end of each of said ground leg and said shaft body is retained by said length of said respective reinforcing arm.

12. The worklight, as recited in claim 9, wherein each of said reinforcing arm, having a predetermined length, has two ends pivotally connecting to said central hub and said respective ground leg at a position above said ground end thereof in such a manner that when said ground legs are outwardly folded into said unfolded position, said distance between said ground end of each of said ground leg and said shaft body is retained by said length of said respective reinforcing arm.

13. The worklight, as recited in claim 7, wherein said retaining unit further comprises means for securely locking said central hub on said shaft body at said unfolded position.

14. The worklight, as recited in claim 9, wherein said retaining unit further comprises means for securely locking said central hub on said shaft body at said unfolded position.

15. The worklight, as recited in claim 12, wherein said retaining unit further comprises means for securely locking said central hub on said shaft body at said unfolded position.

16. The worklight, as recited in claim 3, wherein said shaft body of said central shaft comprises first and second tubular members coaxially mounted with each other in a slidably movable manner such that said shaft body is adapted to selectively adjust a length thereof by coaxially sliding said first tubular member with respect to said second tubular member, wherein said central shaft further comprises means for securely locking said first tubular member with said second tubular member so as to retain said shaft body at said predetermined length.

17. The worklight, as recited in claim 9, wherein said shaft body of said central shaft comprises first and second tubular members coaxially mounted with each other in a slidably movable manner such that said shaft body is adapted to selectively adjust a length thereof by coaxially sliding said first tubular member with respect to said second tubular member, wherein said central shaft further comprises means for securely locking said first tubular member with said second tubular member so as to retain said shaft body at said predetermined length.

18. The worklight, as recited in claim 15, wherein said shaft body of said central shaft comprises first and second tubular members coaxially mounted with each other in a slidably movable manner such that said shaft body is adapted to selectively adjust a length thereof by coaxially sliding said first tubular member with respect to said second tubular member, wherein said central shaft further comprises means for securely locking said first tubular member with said second tubular member so as to retain said shaft body at said predetermined length.

* * * * *